United States Patent
Chila et al.

(10) Patent No.: US 10,982,593 B2
(45) Date of Patent: Apr. 20, 2021

(54) SYSTEM AND METHOD FOR COMBUSTING LIQUID FUEL IN A GAS TURBINE COMBUSTOR WITH STAGED COMBUSTION

(71) Applicant: General Electric Company, Schenectady, NY (US)

(72) Inventors: Ronald James Chila, Greenfield Center, NY (US); Mark William Pinson, Greer, SC (US); Baifang Zuo, Simpsonville, SC (US); Lucas John Stoia, Taylors, SC (US); Timothy James Purcell, Centerville, OH (US)

(73) Assignee: General Electric Company, Schenectady, NY (US)

( * ) Notice: Subject to any disclaimer, the term of this patent is extended or adjusted under 35 U.S.C. 154(b) by 579 days.

(21) Appl. No.: 15/625,031

(22) Filed: Jun. 16, 2017

(65) Prior Publication Data

US 2018/0363551 A1    Dec. 20, 2018

(51) Int. Cl.
*F23R 3/28*    (2006.01)
*F02C 3/24*    (2006.01)
(Continued)

(52) U.S. Cl.
CPC .............. *F02C 3/24* (2013.01); *F02C 7/222* (2013.01); *F23R 3/002* (2013.01); *F23R 3/12* (2013.01);
(Continued)

(58) Field of Classification Search
CPC .. F23R 3/286; F23R 3/34; F23R 3/346; F23R 3/002; F23R 3/12; F23R 3/045;
(Continued)

(56) References Cited

U.S. PATENT DOCUMENTS 2,462,704 A * 2/1949 Zink ...................... F23D 14/00
                                                   239/543
3,668,869 A    6/1972 DeCorso et al.
(Continued)

OTHER PUBLICATIONS

Smid P., CNC Programming Techniques, An Insider's Guide to Effective Methods and Applications, ISBN 0-8311-3185-3 (Year: 2006).*

(Continued)

*Primary Examiner* — Steven M Sutherland
(74) *Attorney, Agent, or Firm* — Charlotte Wilson; James Pemrick (57) ABSTRACT

A combustion system includes a head end comprising a liquid fuel cartridge. The liquid fuel cartridge has liquid fuel injection ports and is configured to produce combustion products via a diffusion flame. A liner is configured to deliver the combustion products from the head end to an aft frame, and an injector having an outlet is located along the liner between the head end and the aft frame. The injector outlet delivers a stream of oxidant inwardly into the liner, such that a mixedness and a velocity of the combustion products are increased prior to the combustion products reaching the aft frame. A method of producing combustion products having characteristics of a premixed flame in a liquid fuel combustion system is also provided herein.

14 Claims, 8 Drawing Sheets

(51) Int. Cl.
- *F23R 3/36* (2006.01)
- *F23R 3/34* (2006.01)
- *F02C 7/22* (2006.01)
- *F23R 3/00* (2006.01)
- *F23R 3/12* (2006.01)

(52) U.S. Cl.
CPC .............. *F23R 3/286* (2013.01); *F23R 3/343* (2013.01); *F23R 3/346* (2013.01); *F23R 3/36* (2013.01); *F05D 2220/32* (2013.01); *F05D 2240/35* (2013.01)

(58) Field of Classification Search
CPC .... F23R 3/36; F02C 3/24; F02C 7/222; F05D 2220/32; F05D 2240/35
See application file for complete search history.

(56) References Cited

U.S. PATENT DOCUMENTS

| | | | | |
|---|---|---|---|---|
| 3,730,438 | A * | 5/1973 | Howe | B05B 1/14 239/490 |
| 4,833,878 | A | 5/1989 | Sood et al. | |
| 5,205,117 | A * | 4/1993 | Shekleton | F23R 3/002 60/778 |
| 5,408,825 | A | 4/1995 | Foss et al. | |
| 5,437,159 | A | 8/1995 | Ansart et al. | |
| 5,657,632 | A | 8/1997 | Foss | |
| 5,924,275 | A | 7/1999 | Cohen et al. | |
| 6,397,602 | B2 | 6/2002 | Vandervort et al. | |
| 8,136,359 | B2 | 3/2012 | Stuttaford et al. | |
| 8,522,554 | B2 | 9/2013 | Intile et al. | |
| 8,671,691 | B2 | 3/2014 | Boardman et al. | |
| 9,188,341 | B2 | 11/2015 | McMasters et al. | |
| 9,217,570 | B2 | 12/2015 | Parsania et al. | |
| 9,261,279 | B2 | 2/2016 | Westmoreland et al. | |
| 9,366,440 | B2 | 6/2016 | Berry | |
| 9,383,098 | B2 | 7/2016 | Means et al. | |
| 9,476,592 | B2 | 10/2016 | Berry | |
| 2005/0000222 | A1 * | 1/2005 | Inoue | F23R 3/10 60/776 |
| 2005/0164138 | A1 * | 7/2005 | Ruck | F23D 11/402 431/2 |
| 2009/0014561 | A1 | 1/2009 | McMasters et al. | |
| 2010/0139280 | A1 * | 6/2010 | Lacy | F23D 14/82 60/737 |
| 2011/0240769 | A1 * | 10/2011 | Khan | F23D 11/38 239/533.9 |
| 2012/0192568 | A1 * | 8/2012 | Miura | F23R 3/286 60/776 |
| 2014/0033718 | A1 * | 2/2014 | Manoharan | F23R 3/10 60/725 |
| 2014/0116054 | A1 * | 5/2014 | Means | F23R 3/283 60/739 |
| 2014/0338359 | A1 * | 11/2014 | Valeev | F23L 7/00 60/776 |
| 2015/0135716 | A1 | 5/2015 | Ginessin et al. | |
| 2016/0033138 | A1 | 2/2016 | Graham et al. | |

OTHER PUBLICATIONS

Winterbone, Advanced Thermodynamics for Engineers, Wiley, ISBN 0-470-23718 (Year: 1997).*

"How to Bend Tubes and Sections", HiTech Alloys, Copyright 2002-2008, printed Jan. 25, 2017 from http://www.hitechalloys.com/hitechalloys_005.htm.

* cited by examiner

SYSTEM AND METHOD FOR COMBUSTING LIQUID FUEL IN A GAS TURBINE COMBUSTOR WITH STAGED COMBUSTION

TECHNICAL FIELD

The present disclosure relates generally to gas turbine combustors and, more particularly, to a system and a method for combusting liquid fuel in gas turbine combustors, such that the combustion gases exiting the combustor exhibit the characteristics of premixed combustion despite being produced by diffusion flames.

BACKGROUND

At least some known gas turbine assemblies include a compressor, a combustor, and a turbine. Gas (e.g., ambient air) flows through the compressor, where the gas is compressed before delivery to one or more combustors. In each combustor, the compressed air is combined with fuel and ignited to generate combustion gases. The combustion gases are channeled from each combustor to and through the turbine, thereby driving the turbine, which, in turn, powers an electrical generator coupled to the turbine. The turbine may also drive the compressor by means of a common shaft or rotor.

The temperature of the combustion gases directly influences the thermodynamic efficiency, design margins, and resulting emissions of the combustor. For example, higher combustion gas temperatures generally improve the thermodynamic efficiency of the combustor. However, higher combustion gas temperatures may increase the disassociation rate of diatomic nitrogen, thereby increasing the production of undesirable emissions such as oxides of nitrogen ($NO_x$) for a particular residence time in the combustor. Conversely, a lower combustion gas temperature associated with reduced fuel flow and/or part load operation (turndown) generally reduces the chemical reaction rates of the combustion gases, thereby increasing the production of carbon monoxide (CO) and unburned hydrocarbons (UHCs) for the same residence time in the combustor.

In order to balance overall emissions performance while optimizing thermal efficiency of the combustor, certain combustor designs generate the combustion gases at two (or more) axially spaced stages. Such combustors are referred to herein as including an "axial fuel staging" (AFS) system, which employs multiple fuel injectors that are arranged around the liner downstream from the primary combustion zone. The AFS fuel injectors deliver fuel and air radially through the liner to provide for fluid communication into the combustion gas flow field.

In a combustor with an AFS system, a primary fuel nozzle at an upstream end of the combustor injects fuel and air (or a fuel/air mixture) in an axial direction into a primary combustion zone, and an AFS fuel injector located at a position downstream of the primary fuel nozzle may be used to inject fuel and air (or a second fuel/air mixture) in a generally radial direction into a secondary combustion zone located downstream of the primary combustion zone. In many instances, both the primary fuel nozzle and the AFS fuel injector operate on gaseous fuel.

When operating on liquid fuel, primary fuel nozzles in conventional combustion systems experience many challenges. In some cases, the liquid spray may insufficiently penetrate across a given area, making it difficult to achieve a stable flame. In other cases, the liquid spray may extend well across a given area, such that liner wetting occurs, leading to coking of the liquid fuel on the liner, which in turn may lead to spallation of the thermal barrier coating or other thermal stresses on the liner. Additionally, coking of the liquid fuel within the fuel nozzles may occur at temperatures well below the operating temperature of the combustor, if the liquid fuel nozzles are not designed to maintain sufficient cooling flow.

SUMMARY

According to one aspect of the present disclosure, a combustion system includes a head end comprising a liquid fuel cartridge. The liquid fuel cartridge has liquid fuel injection ports and is configured to produce combustion products via a diffusion flame. A liner is configured to deliver the combustion products from the head end to an aft frame, and an injector having an outlet is located along the liner between the head end and the aft frame. The injector outlet delivers a stream of oxidant into the liner in a predominantly radial direction, relative to a flow of the combustion products, such that a mixedness and a velocity of the combustion products are increased prior to the combustion products reaching the aft frame.

According to another aspect of the present disclosure, a combustion system includes a head end, a liner extending downstream of the head end to an aft frame, and an injector located along the liner between the head end and the aft frame. The head end includes a cap; a bundled tube fuel nozzle including an array of mixing tubes, each tube having an inlet end through which air is directed and an outlet end positioned through the cap; and a liquid fuel cartridge unit disposed along a longitudinal axis of the cap and radially inward of the bundled tube fuel nozzle. The liquid fuel cartridge unit includes a cartridge tip extending axially through the cap and beyond the outlet ends of the mixing tubes. The cartridge tip further has an aft plate, a side wall circumscribing the aft plate, and a plurality of injection ports defined through the side wall. The plurality of injection ports injects a liquid fuel in a predominantly radial direction relative to the longitudinal axis of the cap to produce combustion products; and the injector delivers a stream of oxidant into the liner for mixing with the combustion products from the liquid fuel cartridge unit.

According to yet another aspect of the present disclosure, a method of producing combustion products having characteristics of a premixed flame in a liquid fuel combustion system is provided. The liquid fuel combustion system includes a head end with a liquid fuel cartridge configured to produce combustion products via a diffusion flame; a liner configured to deliver the combustion products from the head end to an aft frame; and an injector having an outlet located along the liner between the head end and the aft frame. The method includes injecting liquid fuel from the liquid fuel cartridge in a predominantly radial direction, relative to a flow of combustion products; and combusting the liquid fuel with air to produce the combustion products via a diffusion flame. The method further includes delivering the combustion products in a downstream direction through the liner; and injecting into the liner a stream of oxidant via the injector located axially downstream of the liquid fuel cartridge, thereby increasing a mixedness and a velocity of the combustion products prior to the aft frame.

BRIEF DESCRIPTION OF THE DRAWINGS

A full and enabling disclosure of the present products and methods, including the best mode thereof, directed to one of ordinary skill in the art, is set forth in the specification, which refers to the appended figures, in which.

DETAILED DESCRIPTION

The following detailed description illustrates a gas turbine combustor, a liquid fuel cartridge unit for delivering liquid fuel to the gas turbine combustor, and a method of assembling a liquid fuel cartridge unit for a gas turbine combustor, by way of example and not limitation. The description enables one of ordinary skill in the art to make and use the combustion system including the present liquid fuel cartridge unit. The description includes what is presently believed to be the best modes of making and using the present combustion system and liquid fuel cartridge unit. An exemplary liquid fuel cartridge unit is described herein as being coupled to a combustor of a heavy-duty gas turbine assembly used for electrical power generation. However, it is contemplated that the liquid fuel cartridge unit described herein may have general application to a broad range of systems in a variety of fields other than electrical power generation.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

The term "radially" refers to the relative direction that is substantially perpendicular to an axial centerline of a particular component, and the term "predominantly radially" refers to the relative direction of a flow that is oblique, or transverse, to the centerline of a particular component. The term "axially" refers to the relative direction that is substantially parallel to an axial centerline of a particular component. As used herein, the term "radius" (or any variation thereof) refers to a dimension extending outwardly from a center of any suitable shape (e.g., a square, a rectangle, a triangle, etc.) and is not limited to a dimension extending outwardly from a center of a circular shape. Similarly, as used herein, the term "circumference" (or any variation thereof) refers to a dimension extending around a center of any suitable shape (e.g., a square, a rectangle, a triangle, etc.) and is not limited to a dimension extending around a center of a circular shape.

Each example is provided by way of explanation, not limitation of the invention. In fact, it will be apparent to those skilled in the art that modifications and variations can be made in the present liquid fuel cartridge unit, without departing from the scope or spirit of the present disclosure. For instance, features illustrated or described as part of one embodiment may be used on another embodiment to yield a still further embodiment. Thus, it is intended that the present disclosure encompasses such modifications and variations as fall within the scope of the appended claims and their equivalents. Although exemplary embodiments of the present liquid fuel cartridge unit and method will be described generally in the context of a combustor incorporated into a gas turbine for purposes of illustration, one of ordinary skill in the art will readily appreciate that embodiments of the present disclosure may be applied to any combustor incorporated into any turbomachine and is not limited to a gas turbine combustor, unless specifically recited in the claims.

Reference will now be made in detail to various embodiments of the present liquid fuel cartridge unit and method, one or more examples of which are illustrated in the accompanying drawings. The detailed description uses numerical and letter designations to refer to features in the drawings. Like or similar designations in the drawings and description have been used to refer to like or similar parts.

Figure 1:
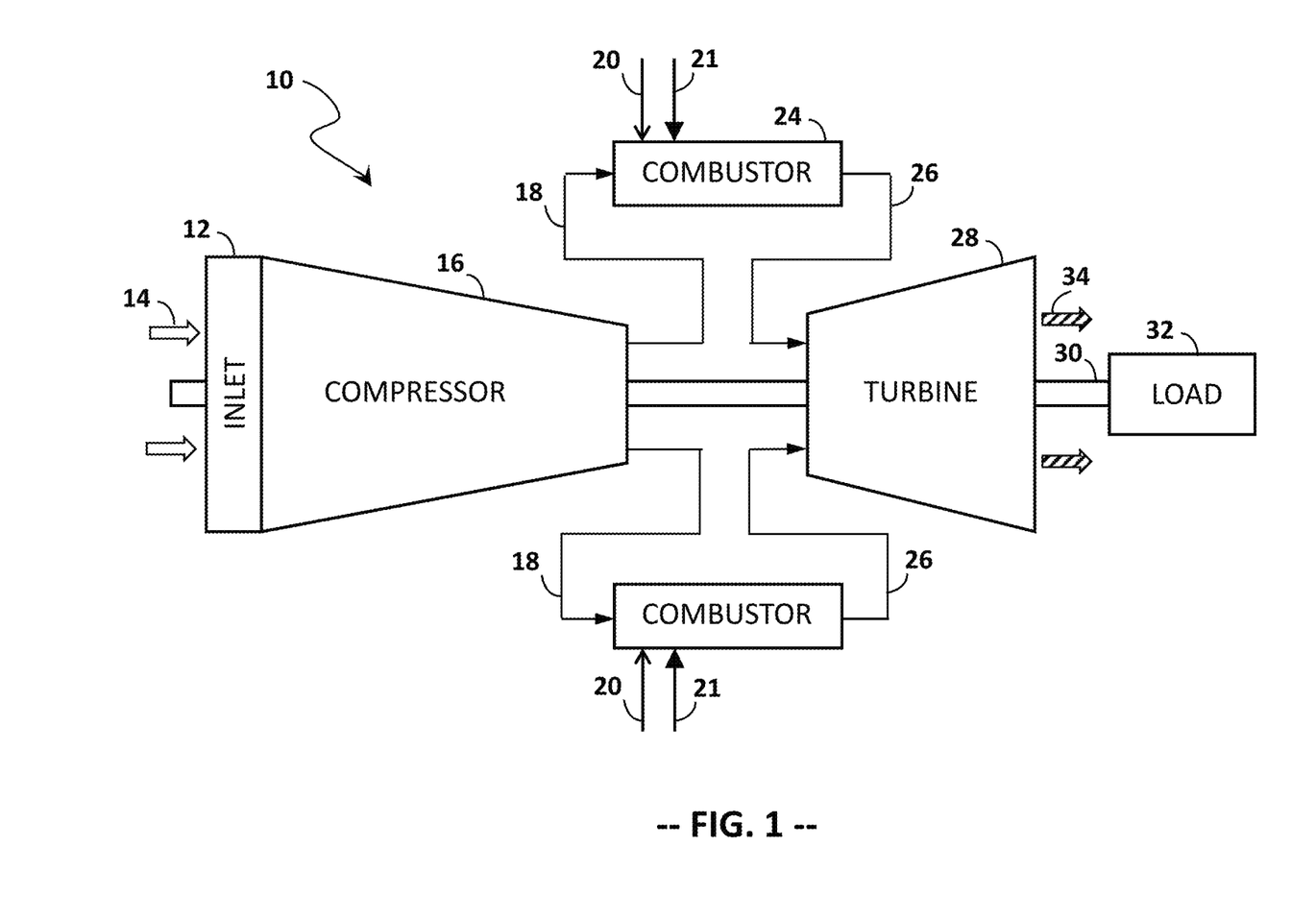
FIG. 1 is a schematic diagram of a gas turbine assembly, which may employ one or more fuel injectors, as described herein.

FIG. 1 provides a functional block diagram of an exemplary gas turbine 10 that may incorporate various embodiments of the present disclosure. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18.

The compressed working fluid 18 is mixed with a gaseous fuel 20 from a gaseous fuel supply system and/or a liquid fuel 21 from a liquid fuel supply system to form a combustible mixture within one or more combustors 24. The combustible mixture is burned to produce combustion gases 26 having a high temperature, pressure, and velocity. The combustion gases 26 flow through a turbine 28 of a turbine section to produce work. For example, the turbine 28 may be connected to a shaft 30 so that rotation of the turbine 28 drives the compressor 16 to produce the compressed working fluid 18. Alternately or in addition, the shaft 30 may connect the turbine 28 to a generator 32 for producing electricity. Exhaust gases 34 from the turbine 28 flow through an exhaust section (not shown) that connects the turbine 28 to an exhaust stack downstream from the turbine. The exhaust section may include, for example, a heat recovery steam generator (not shown) for cleaning and extracting additional heat from the exhaust gases 34 prior to release to the environment.

The combustors 24 may be any type of combustor known in the art, and the present invention is not limited to any particular combustor design unless specifically recited in the claims. For example, the combustor 24 may be a can type (sometime called a can-annular type) of combustor.

Figure 2:
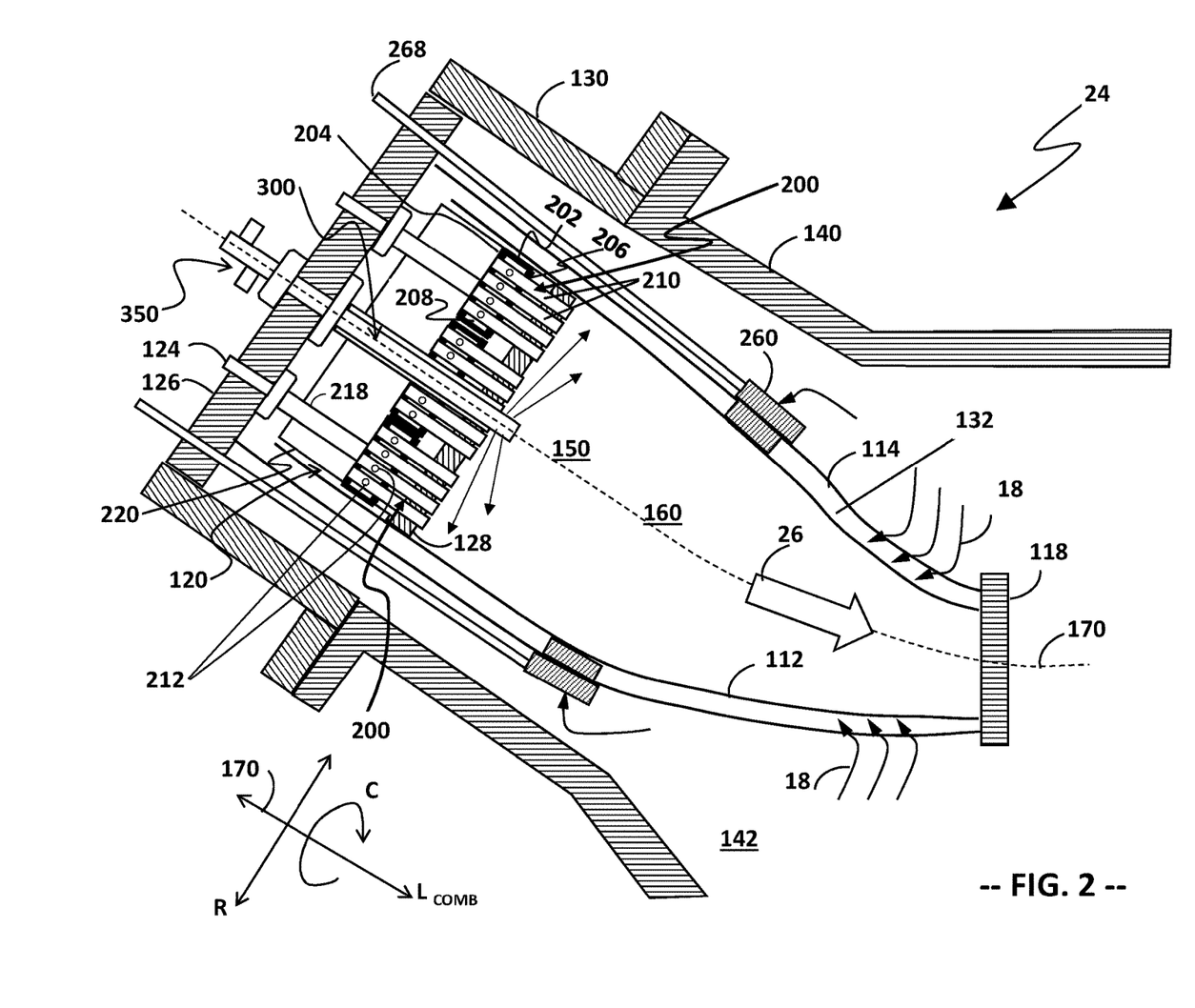
FIG. 2 is a cross-sectional view of a combustor, which may be used in the gas turbine assembly of FIG. 1.

FIG. 2 is a schematic representation of a combustion can 24, as may be included in a can annular combustion system for the heavy-duty gas turbine 10. In a can annular combustion system, a plurality of combustion cans 24 (e.g., 8, 10, 12, 14, 16, or more) are positioned in an annular array about the shaft 30 that connects the compressor 16 to the turbine 28.

As shown in FIG. 2, the combustion can 24 includes a liner 112 that contains and conveys combustion gases 26 to the turbine. The liner 112 defines a combustion chamber within which combustion occurs. The liner 112 may have a cylindrical liner portion and a tapered transition portion that is separate from the cylindrical liner portion, as in many conventional combustion systems. Alternately, the liner 112 may have a unified body (or "unibody") construction, in which the cylindrical portion and the tapered portion are integrated with one another. Thus, any discussion of the liner 112 herein is intended to encompass both conventional combustion systems having a separate liner and transition piece and those combustion systems having a unibody liner. Moreover, the present disclosure is equally applicable to those combustion systems in which the transition piece and the stage one nozzle of the turbine are integrated into a single unit, sometimes referred to as a "transition nozzle" or an "integrated exit piece."

The liner 112 may be surrounded by an outer sleeve 114, which is spaced radially outward of the liner 112 to define an annulus 132 between the liner 112 and the outer sleeve 114. The outer sleeve 114 may include a flow sleeve portion at the forward end and an impingement sleeve portion at the aft end, as in many conventional combustion systems. Alternately, the outer sleeve 114 may have a unified body (or "unisleeve") construction, in which the flow sleeve portion and the impingement sleeve portion are integrated with one another in the axial direction. As before, any discussion of the outer sleeve 114 herein is intended to encompass both convention combustion systems having a separate flow sleeve and impingement sleeve and combustion systems having a unisleeve outer sleeve.

A head end portion 120 of the combustion can 24 includes one or more fuel nozzles 200. The fuel nozzles 200, as illustrated, may be described as bundled tube fuel nozzles. Each fuel nozzle 200 includes a housing 202 extending in an axial direction, which circumscribes a plurality of mixing tubes 210 oriented in parallel to one another. Each tube 210 has an inlet end, an outlet end, and one or more fuel injection holes 212 defined through the tube wall between the inlet end and the outlet end.

The housing 202 is joined to an upstream plate 204 and a downstream plate 206, such that a fuel plenum 208 is defined between the housing 202 and the plates 204, 206. The fuel plenum 208 is in fluid communication with a fuel supply conduit 218 and the fuel injection holes 212 of each tube 210. The fuel supply conduit 218 of each fuel nozzle 122 is in fluid communication with a respective fuel inlet 124. The fuel inlets 124 may be formed through an end cover 126 at a forward end of the combustion can 24.

The head end portion 120 of the combustion can 24 is at least partially surrounded by a forward casing 130, which is physically coupled and fluidly connected to a compressor discharge case 140. The compressor discharge case 140 is fluidly connected to an outlet of the compressor 16 and defines a pressurized air plenum 142 that surrounds at least a portion of the combustion can 24. Air 18 flows from the compressor discharge case 140 into the annulus 132 at an aft end of the combustion can, via openings defined in the outer sleeve 114. Because the annulus 132 is fluidly coupled to the head end portion 120, the air flow 18 travels upstream from the aft end 118 of the combustion can 24 to the head end portion 120, where the air flow 18 reverses direction and enters the fuel nozzles 200. An inlet flow conditioner 220 having a plurality of openings or slots (not separately shown) may be used to condition or homogenize the flow entering the fuel nozzles 200.

The tubes 210 have inlet ends defined through corresponding openings (not shown) in the upstream plate 204. Air 18 passes through the inlet ends of the tubes 210 and, during gaseous fuel operation, mixes with fuel passing through the fuel injection holes 212 from the fuel plenum 208. The downstream (or outlet) ends of the tubes 210 extend through a unified combustor cap 128 (or individual plates corresponding to the size and shape of the upstream plates 204 for each fuel nozzle 200).

During gaseous fuel operation, fuel 20 and compressed air 18 are introduced by the fuel nozzles 200 into a primary combustion zone 150 at a forward end of the liner 112, where the fuel and air are combusted to form combustion gases 26. In the illustrated embodiment, the fuel and air are mixed within the fuel nozzles 200 (e.g., in a premixed fuel nozzle). In other embodiments, the fuel and air may be separately introduced into the primary combustion zone 150 and mixed within the primary combustion zone 150 (e.g., as may occur with a diffusion nozzle). Reference made herein to a "first fuel/air mixture" should be interpreted as describing both a premixed fuel/air mixture and a diffusion-type fuel/air mixture, either of which may be produced by fuel nozzles 200. The combustion gases 26 travel downstream toward the aft end 118 of the combustion can 24, the aft end 118 being represented by an aft frame of the combustion can 24.

When the combustor 24 is operating on gaseous fuel, additional fuel and air may be introduced by one or more fuel injectors 260 into a secondary combustion zone 160, where the fuel and air are ignited by the combustion gases from the primary combustion zone 150 to form a combined combustion gas product stream 26. The fuel injectors 260 receive fuel from a fuel supply line 268 and air from the high-pressure air plenum 142. Such a combustion system having axially separated combustion zones is described as an "axial fuel staging" (AFS) system, and the downstream injectors 260 may be referred to as "AFS injectors."

When the combustion can 24 is operated solely on liquid fuel, the liquid fuel 21 and compressed air 18 are introduced by a liquid fuel cartridge unit 300 into the primary combustion zone 150 at a forward end of the liner 112, where the liquid fuel and air are combusted to form combustion gases 26. The liquid fuel and air are separately introduced into the primary combustion zone 150 and mixed within the primary combustion zone 150 to produce a diffusion-style flame.

In the illustrated embodiment, the liquid fuel cartridge unit 300 is co-axial with a longitudinal axis of the combustor 24. By having a centrally located liquid fuel cartridge unit 300 (as opposed to localized liquid fuel cartridges installed within each fuel nozzle 200), the surface area available for the mixing tubes 210 is maximized.

In at least one embodiment, the bundled tube fuel nozzles 200 are unfueled during liquid fuel operation. As a result, air flows through the individual tubes 210 of the bundled tube fuel nozzles 200 and produces a plurality of small air streams flowing in a direction generally parallel to the longitudinal axis of the combustor 24.

The liquid fuel cartridge unit 300 includes a cartridge tip 400 having a plurality of fuel injection ports 470, 480, 490 (shown in more detail in FIGS. 7 and 8) that inject streams of liquid fuel 21 in one or more directions transverse, or oblique, to the air streams originating from the tubes 210 of the unfueled bundled tube fuel nozzles 200. The large number of small air streams help to atomize the liquid fuel 21 and facilitate its combustion, while helping to ensure that the liquid fuel droplets do not reach the inner surface of the liner 112.

Additionally, during dedicated liquid fuel operation, the one or more AFS fuel injectors 260 may remain unfueled. In this case, the unfueled AFS injectors 260 direct relatively large streams of air into an area that, in gaseous fuel operation, is the secondary combustion zone 160. In this area, downstream of the primary combustion zone 150, the air from the unfueled AFS injectors 260 effectively churns and mixes the combustion products generated by the liquid fuel cartridge unit 300, such that the combustion products exiting the combustor aft frame 118 resemble those originating from a premixed flame, which is characterized by having a greater degree of mixedness and a higher velocity as compared with those produced by an unimpeded diffusion flame.

Figure 3:
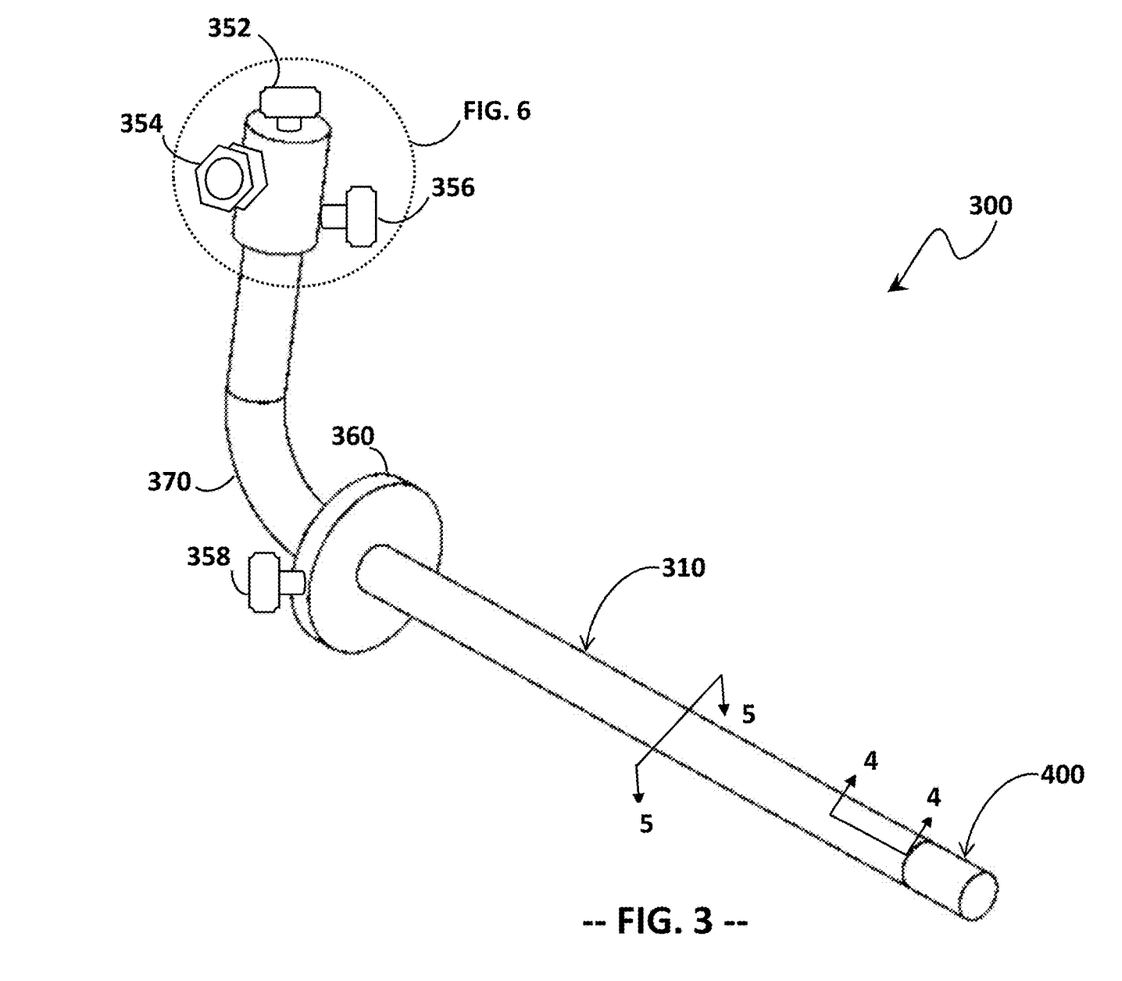
FIG. 3 is a perspective view of a liquid fuel cartridge unit, as may be used in the combustor of FIG. 2.
Figure 4:
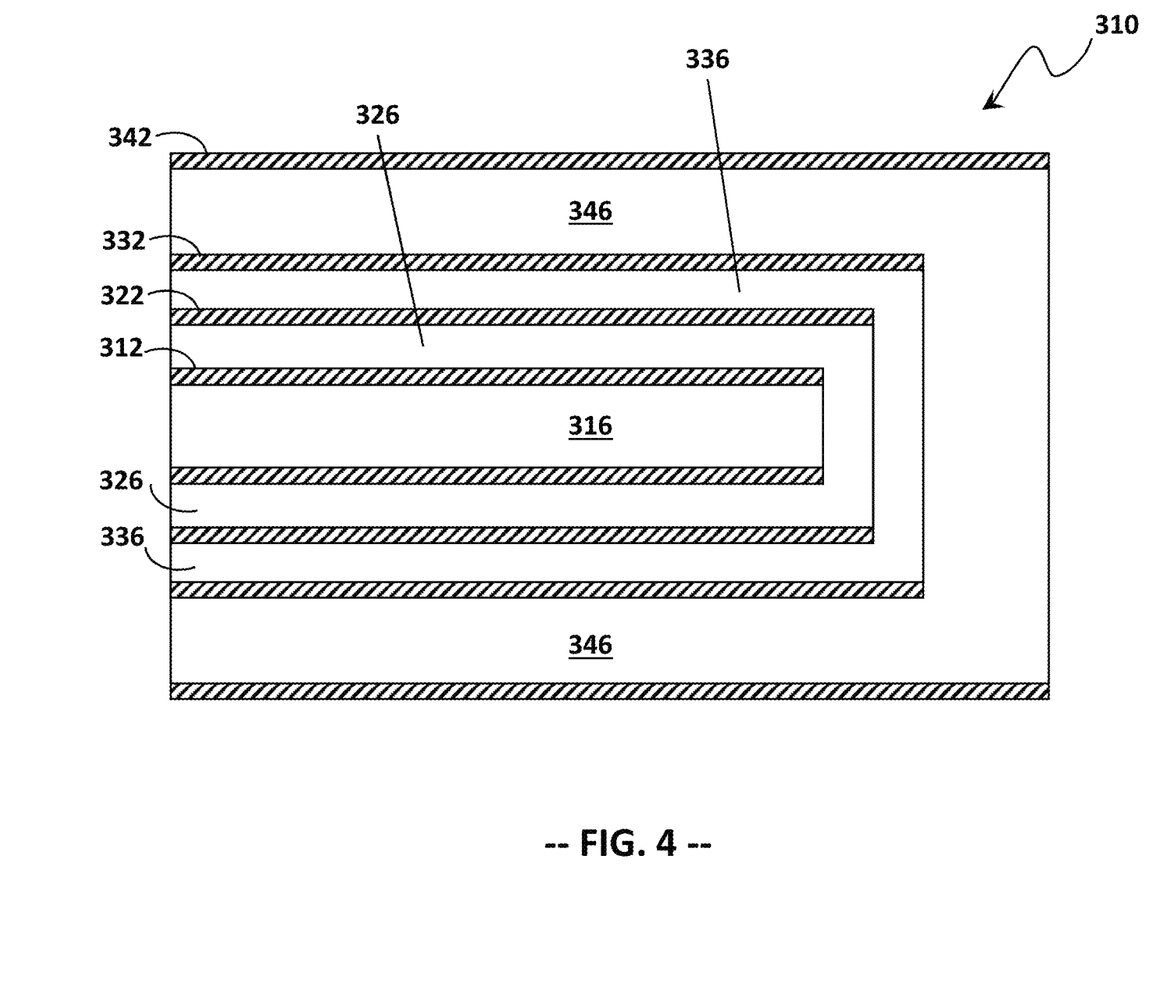
FIG. 4 is a cross-sectional perspective view of the liquid fuel cartridge unit of FIG. 3, taken along the length of the liquid fuel cartridge unit.
Figure 5:
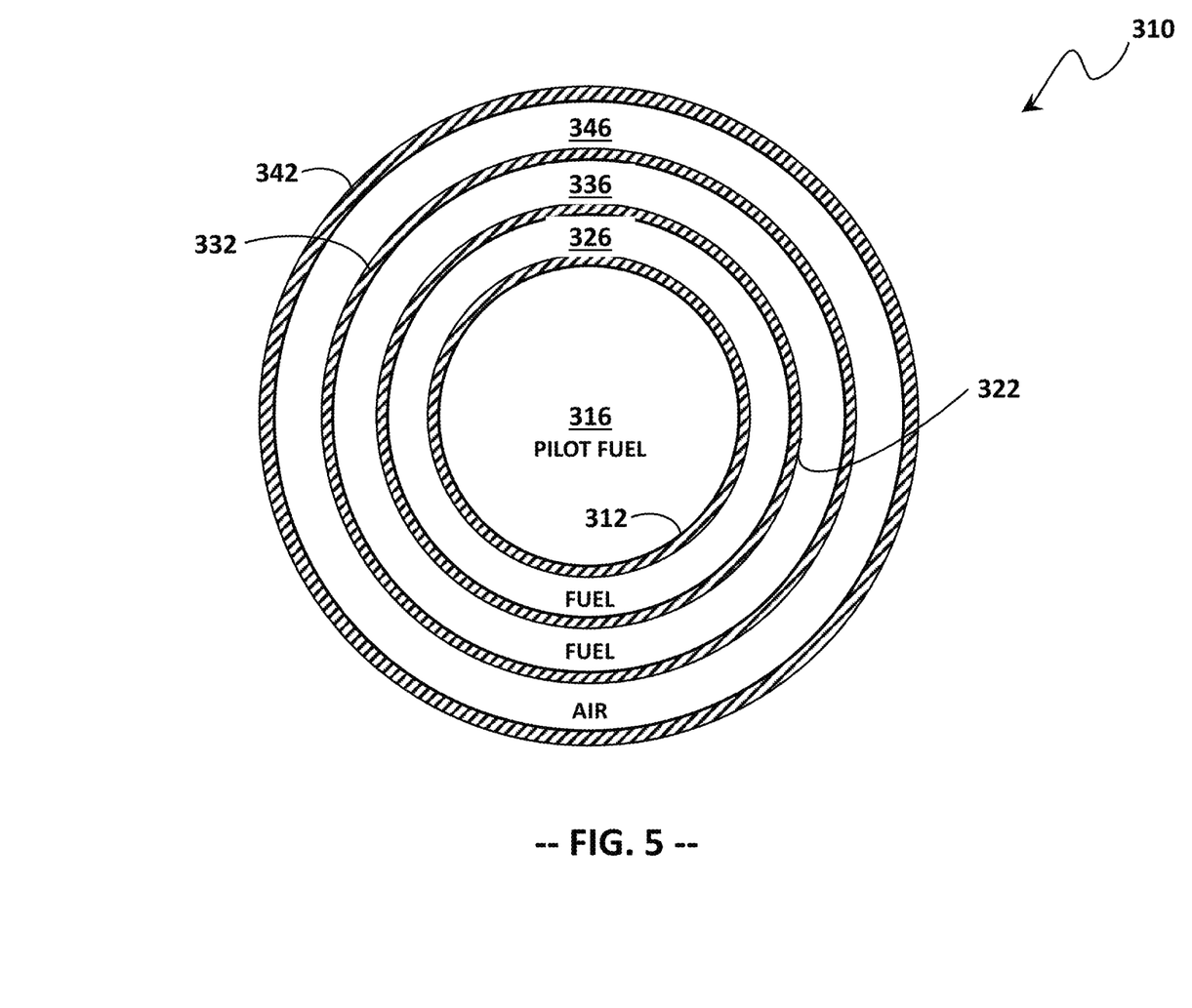
FIG. 5 is a cross-sectional view of the liquid fuel cartridge unit of FIG. 3, taken along an axial plane of the liquid fuel cartridge unit between a cartridge tip and a fluid manifold hub.
Figure 6:
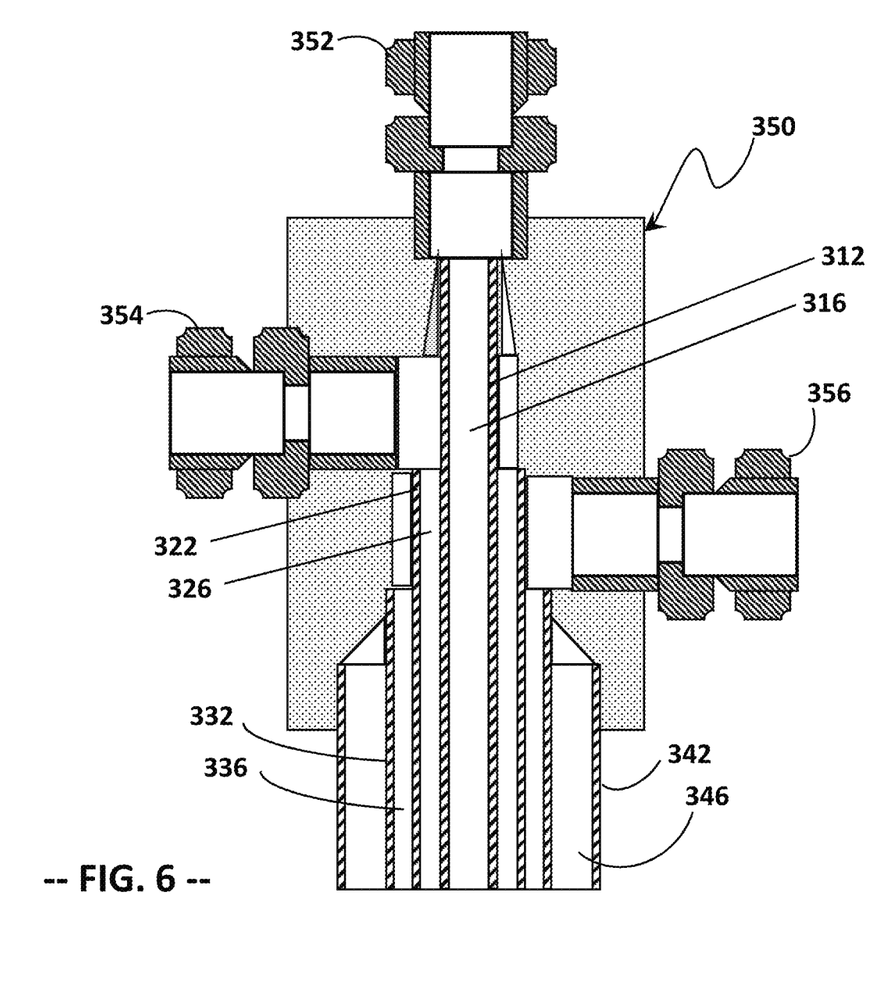
FIG. 6 is an enlarged perspective view of the fluid manifold hub of the liquid fuel cartridge unit of FIG. 3.

FIGS. 3 through 5 illustrate the liquid fuel cartridge unit 300 in greater detail, while FIG. 6 illustrates a fluid manifold hub 350 located at an upstream end of the liquid fuel cartridge unit 300. The liquid fuel cartridge unit 300 includes a supply tube assembly 310 having a downstream end to which the cartridge tip 400 is attached. The fluid manifold hub 350 is attached to the upstream end of the supply tube assembly 310, and a flange 360 circumscribes the supply tube assembly 310 at a position nearer to the fluid manifold hub 350 than the cartridge tip 400. The fluid manifold hub 350 surrounds the supply tube assembly 310 and includes a pilot fuel inlet 352, a first fuel inlet 354, and a second fuel inlet 356.

The supply tube assembly 310 includes a number of nested supply tubes, defining therebetween a number of flow passages. In at least one embodiment, the supply tubes may be concentric with one another. As best understood with reference to the exemplary embodiment shown in FIGS. 4 and 5, the supply tube assembly 310 is provided with a first supply tube 312, a second supply tube 322 circumferentially surrounding the first supply tube 312, a third supply tube 332 circumferentially surrounding the second supply tube 322, and a fourth supply tube 342 circumferentially surrounding the third supply tube 332. A first flow passage 316 is defined within the first supply tube 312; a second flow passage 326 is defined between the outer surface of the first supply tube 312 and the inner surface of the second supply tube 322; a third flow passage 336 is defined between the outer surface of the second supply tube 322 and the inner surface of the third supply tube 332; and a fourth flow passage 346 is defined between the outer surface of the third supply tube 332 and the inner surface of the fourth supply tube 342.

Air flows into the fourth flow passage 346, via an air inlet 358 in the flange 360 (FIG. 3). The air in the fourth flow passage 346 provides a degree of thermal insulation (cooling) the supply tube assembly 310, which helps to minimize coking of the liquid fuel. A protective sheath 362 (shown in FIG. 4) circumferentially surrounds the fourth supply tube 342 along a length of the fourth supply tube 342 upstream of the flange 360, the protective sheath 362 extending from the flange 360 to the fluid manifold hub 350. The protective sheath 362 defines a "dead" cavity—that is, a cavity through which no fluid flows.

To facilitate installation and fuel delivery, the supply tube assembly 310 may be provided with a bend 370 at a location upstream of the cartridge tip 400. The bend 370 is nearer to the upstream ends of the supply tubes 312, 322, 332, 342 and the fluid manifold hub 350 than to the downstream ends of the supply tubes 312, 322, 332, 342 and the cartridge tip 400. In other words, the bend 370 is proximate the upstream ends of the supply tubes 312, 322, 332, 342. The bend 370 may define an approximate right angle (90-degrees+/−5-degrees) or any other angle suitable for delivering fuel to the fluid manifold hub 350. To bend the supply tubes 312, 322, 332, 342 while maintaining their internal spacing, the supply tubes 312, 322, 332, 342 are filled with a removable material, as will be discussed further herein.

Referring now to FIG. 6, the first flow passage 316 is in flow communication with a source of pilot fuel, via a pilot fuel inlet 352 on the fluid manifold hub 350. The second flow passage 326 and the third flow passage 336 are in flow communication with a source of liquid fuel (or a liquid fuel/water mixture), via a first fuel inlet 354 and a second fuel inlet 356, respectively. The pilot fuel inlet 352 is aligned coaxially with the first supply tube 312. The first fuel inlet 354 and the second fuel inlet 356 are disposed opposite one another and are aligned in a transverse direction relative to the second supply tube 322 and the third supply tube 332, respectively. Other arrangements of the pilot fuel inlet 352, the first fuel inlet 354, and the second fuel inlet 356 may instead be employed, as needs dictate.

Figure 7:
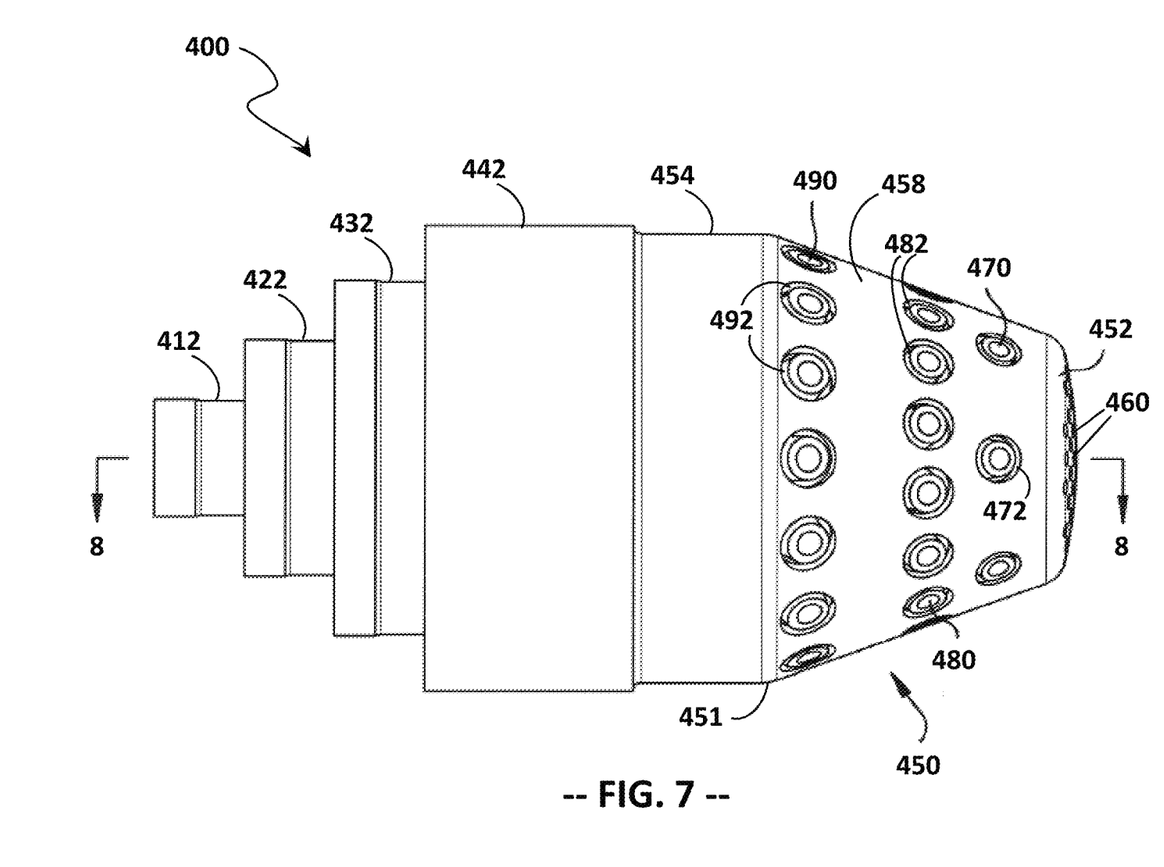
FIG. 7 is a side view of the cartridge tip of the liquid fuel cartridge of FIG. 3.
Figure 8:
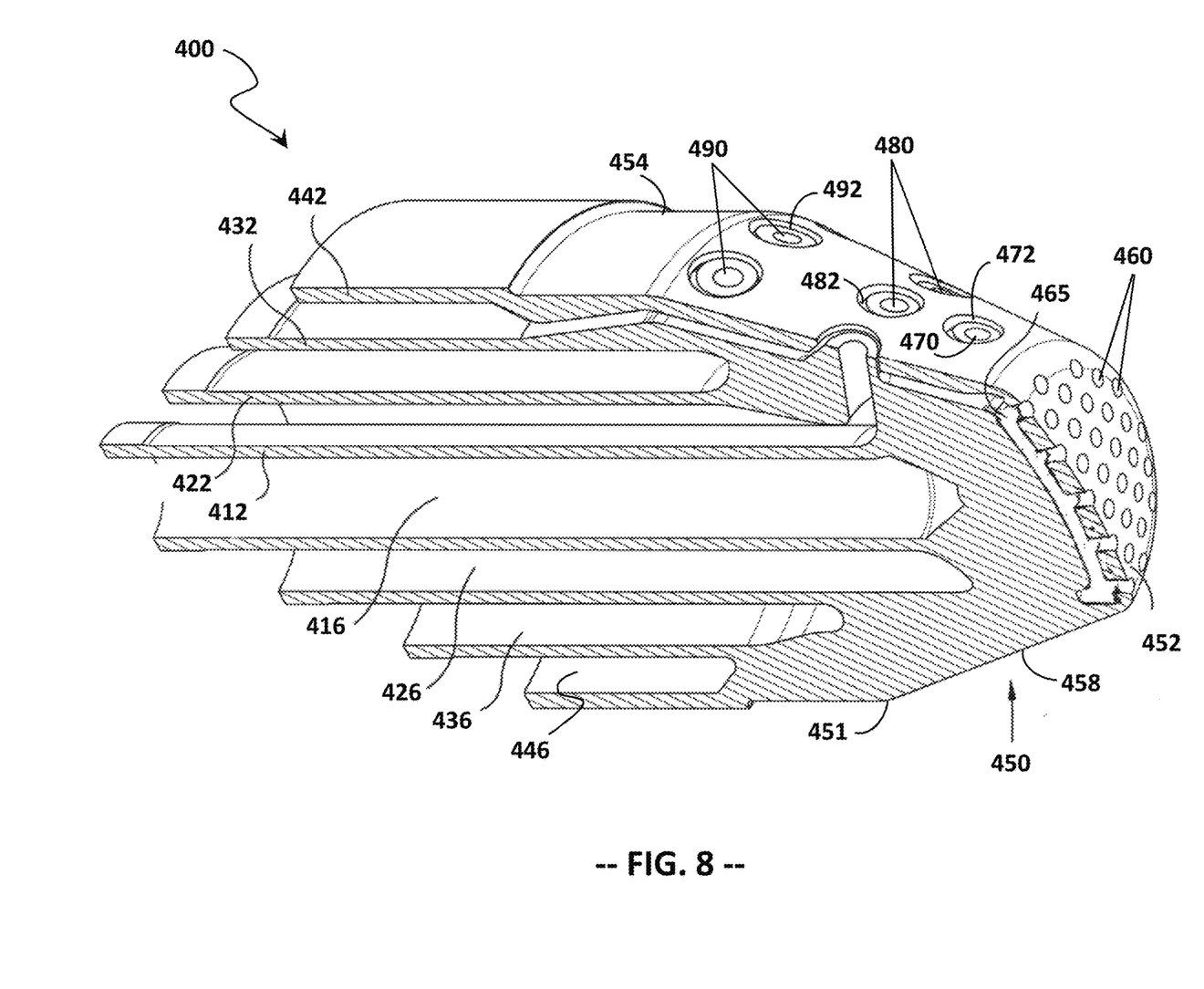
FIG. 8 is a cross-sectional side view of the cartridge tip of FIG. 7.

FIG. 7 shows a perspective view, and FIG. 8 shows a cross-sectional view of the cartridge tip 400 of the liquid fuel cartridge unit 300. In the exemplary embodiment shown, the cartridge tip 400 includes four nested conduits 412, 422, 432, 442 that deliver their respective fluids (e.g., fuel or air) through nested flow passages 416, 426, 436, 446 toward or to the downstream end of the cartridge tip 400. In other embodiments, at least three nested conduits 412, 422, 432 may be employed. To facilitate assembly, the conduits 412, 422, 432, 442 have different lengths from longest to shortest, respectively.

The outermost conduit (e.g., the fourth conduit 442) is coupled to a cylindrical portion 454 of the cartridge tip 400, which may or may not have a diameter smaller than that of the outermost conduit. The cylindrical portion 454 extends axially between the outermost conduit 442 and a frustoconical portion 450 of the cartridge tip 400. The frustoconical portion 450 has a base perimeter that joins the cylindrical portion 454 and that has a first diameter equal to that of the cylindrical portion. The frustoconical portion 450 has a downstream end opposite the base perimeter. The downstream end may be referred to as an aft plate 452, which has a second diameter that is smaller than the first diameter. A circumferential side wall 458 extends axially between the base perimeter and the aft plate 452. The aft plate 452, the circumferential side wall 458, and, optionally, the cylindrical portion 454 may be coated with a thermal barrier coating.

The circumferential side wall 458 defines therethrough one or more rows of injection ports 470, 480, 490. A first set of injection ports 470 is proximate the aft plate 452. A second set of injection ports 480 is upstream of the first set of injection ports 470, and a third set of injection ports 490 is upstream of the second set of injection ports 480. Each injection port 470, 480, 490 defines an aperture through which a fluid (e.g., fuel or a fuel/water mixture) flows, and each port 470, 480, 490 is at least partially circumferentially surrounded by an air vent 472, 482, 492, respectively. As used herein, the term "injection port" should be understood as embodying one or more injection apertures or nozzles (e.g., simplex nozzles).

In one embodiment, the first set of injection ports 470 has fewer injection ports than the second set of injection ports 480, while the second set of injection ports 480 and the third set of injection ports 490 may be equal in number. Each injection port 470 in the first set of injection ports has a first size. Each injection port 480 in the second set of injection ports has a second size. Each injection port 490 in the third set of injection ports has a third size. In one embodiment, as illustrated, the first size is smaller than the second size, and the second size is smaller than the third size.

The circumferential positioning of the injection ports 470, 480, and/or 490 may be optimized to balance the mixing of the liquid fuel and air with the desire for penetration of the liquid fuel across a given area (e.g., an area downstream of the cap 128. Fuel from the injection ports 470, 480, and 490, which encounters air streams from a large number of the mixing tubes 210, achieves greater mixing but less penetration in a radial direction, and the opposite is also true. For that reason, it may be desirable, in some instances, to align some of the injection ports 470, 480, and/or 490 with spaces between adjacent bundled tube fuel nozzles 200 to increase penetration. To that end, the injection ports 470, 480, and/or 490 may be arranged with non-uniform spacing between adjacent ports, or the injection ports 470, 480, and/or 490 may be uniformly spaced about the circumference of the cartridge tip 400. Moreover, although each set of injection ports 470, 480, and 490 is shown as being arranged along a single axial plane, it should be understood that the injection ports of one or more sets 470, 480, or 490 may be disposed in more than one axial plane.

The first set of injection ports 470 is in fluid communication with the first flow passage 416, which is fluidly connected to the first flow passage 316 of the first fuel supply tube 312. In an exemplary embodiment, the first fuel supply tube 312 is in flow communication with a source of pilot fuel.

The second set of injection ports 480 is in fluid communication with the second flow passage 426, which is fluidly connected to the second flow passage 326 of the second fuel supply tube 322. In an exemplary embodiment, the second fuel supply tube 322 is in flow communication with a source of liquid fuel (or a liquid fuel/water mixture).

The third set of injection ports 490 is in fluid communication with the third flow passage 436, which is fluidly connected to the third flow passage 336 of the third fuel supply tube 332. In an exemplary embodiment, the third fuel supply tube 332 is in flow communication with a source of liquid fuel (or a liquid fuel/water mixture). The source of liquid fuel (or a liquid fuel/water mixture) may be common between the second fuel supply tube 322 and the third fuel supply tube 332.

The fourth flow passage 446 is in flow communication with a source of compressed air, via the fourth supply tube 346. The compressed air flows through the fourth flow passage 446 along the perimeter of the cartridge tip 400 to provide cooling thereto. A portion of the compressed air flows through the air vents 472, 482, 492 around the injection ports 470, 480, 490, respectively, while a second portion of the compressed air is directed to an air chamber 465 adjacent the aft plate 452. Air from the air chamber 465 flows through a plurality of air apertures 460 disposed in the aft plate 452, the air apertures 460 being in flow communication with the fourth flow passage 446.

The cartridge tip 400 may be manufactured using additive manufacturing, such as a metal powder additive manufacturing system or other additive manufacturing system, depending on the materials used. More details about the manufacturing of the cartridge tip 400 may be found in commonly assigned U.S. patent application Ser. No. 15/384, 725, filed Dec. 20, 2016, entitled "Additively Manufactured Object with Self-Breaking Support with Fluid Passage," and U.S. patent application Ser. No. 15/434,386, filed Feb. 16, 2017, entitled "Object with Tear-Shaped Suspension for Annular Bodies."

To assemble the liquid fuel cartridge unit 300, the cartridge tip 400 with a plurality of nested conduits 412, 422, 432 (as described above) is provided. A downstream end of the first supply tube 312 is joined to the first conduit 412. A downstream end of the second supply tube 322 is joined to the second conduit 422, such that the second supply tube 322 circumscribes the first supply tube 312. A downstream end of the third supply tube 332 is joined to the third conduit 432, such that the third supply tube 332 circumscribes the second supply tube 322, thereby forming a nested tube assembly 310. The joining of the downstream ends of the supply tubes 312, 322, 332 to the respective conduits 412, 422, 432 may be accomplished by welding or brazing, or by any other joining techniques known in the art.

In some embodiments, a downstream end of the fourth supply tube 342 is joined to a fourth conduit 442, such that the fourth supply tube 342 circumscribes the third supply tube 332. The mounting flange 360 may be provided downstream of the location of the bend 370, and may include the air inlet 358 that is in flow communication with the fourth supply tube 342. The fourth supply tube 342 may be joined to the fourth conduit 442 by welding or brazing, or any other joining techniques known in the art.

To bend the nested tube assembly 310 while maintaining the internal spacing of the supply tubes 312, 322, 332, and, optionally, 342, the supply tubes 312, 322, 332, and, when present, 342, are filled with a removable material. The removable material may be one of resin, powder, granules, pitch, sand, lead, and certain alloy materials having a melting point less than the boiling point of water. One such exemplary removable alloy material is a eutectic, fusible alloy of 50% bismuth, 26.7% lead, 13.3% tin, and 10% cadmium by weight, which has a melting point of approximately 70° C. (158° F.), which may be referred to as Wood's Metal, and which is sold under the tradenames CER-ROBEND™, BENDALLOY™, PEWTALLOY™, and MCP158™. This alloy material conforms to the inside of the tubes, allowing them to be bent as a solid structure.

In one embodiment, the supply tubes 312, 322, 332, and, when present, 342 are lubricated with an oil before they are filled with the eutectic alloy material. With the molten alloy material in place, the supply tube assembly 310 may be cooled with water to set, or crystallize, the alloy material. When the supply tube assembly 310 and the alloy material reach room temperature, the supply tube assembly 310 may be bent around a die to achieve the desired radius of curvature. Once the bend 370 is created, the alloy material may be removed from the conduit assembly 310 using steam, boiling water, or hot air. The alloy material may be recovered for subsequent reuse.

The bend 370 is located nearer to the upstream ends of the supply tubes 312, 322, 332, than to the downstream ends of the supply tubes 312, 322, 332. Said differently, the location of the bend 370 is proximate the upstream ends of the supply tubes 312, 322, 332.

Once the bend 370 is set, the upstream ends of the supply tubes 312, 322, 332 are joined to the fluid manifold hub 350, such that the supply tubes 312, 322, 332 are supported solely by the cartridge tip 400 (at their respective downstream ends) and the fluid manifold hub 350 (at their respective upstream ends). The joining of the upstream ends of the supply tubes 312, 322, 332 to the fluid manifold hub 350 may be accomplished by welding or brazing.

As discussed previously, the fluid manifold hub 350 may be provided with a first fluid inlet (e.g., the pilot fuel inlet 352) in flow communication with the first supply tube 312. The fluid manifold hub 350 may be provided with additional fuel inlets 354, 356, which provide liquid fuel (or a liquid fuel/water mixture) as separate fuel circuits to the second supply tube 322 and the third supply tube 332, respectively. The pilot fuel inlet 352 is provided upstream of the fuel inlet 354, and the fuel inlet 354 is provided upstream of the fuel inlet 356.

The methods and devices described herein facilitate the introduction of liquid fuel in the head end of a power-generating gas turbine combustor. More specifically, the methods and devices facilitate delivering liquid fuel (or a liquid fuel/water mixture) through a centrally located liquid fuel cartridge unit in such a way as to improve the distribution of the liquid fuel across the combustion zone without wetting the walls of the surrounding liner. Used in conjunction with a head end including unfueled bundled tube fuel nozzles, the air streams from the individual tubes help to atomize the liquid fuel and produce a stable diffusion flame.

Further, by introducing additional large jets as cross-flows into the combustion liner, via unfueled downstream fuel injectors, the combustion products produced by the diffusion flame assume the characteristics of a premixed flame, in terms of a greater degree of mixedness and a higher velocity than diffusion flames allowed to propagate unimpeded to the combustor exit.

The methods and devices therefore facilitate improving the overall operating efficiency of a combustor such as, for example, a combustor in a turbine assembly. This increases the turbine output. Moreover, the present fuel liquid fuel cartridge unit provides greater operational flexibility in that the combustor is configured to burn both liquid fuel and natural gas at different times.

Exemplary embodiments of the liquid fuel cartridge unit and methods of fabricating the same are described above in detail. The methods and devices described herein are not limited to the specific embodiments described herein, but rather, components of the methods and devices may be utilized independently and separately from other components described herein. For example, the methods and devices described herein may have other applications not limited to practice with turbine assemblies, as described herein. Rather, the methods and devices described herein can be implemented and utilized in connection with various other industries.

While the invention has been described in terms of various specific embodiments, those skilled in the art will recognize that the invention can be practiced with modification within the spirit and scope of the claims.

What is claimed is:

1. A combustion system comprising:
    a head end comprising a fuel nozzle and a liquid fuel cartridge, the liquid fuel cartridge configured to produce combustion products via a diffusion flame, the liquid fuel cartridge having a cartridge tip with a frusto-conical shape defined by an upstream end having a first diameter and a downstream end having a second diameter smaller than the first diameter, the frusto-conical shape including a side wall extending from the upstream end to the downstream end and an end wall defining the downstream end; wherein the side wall defines a plurality of liquid fuel injection ports therethrough;
    a liner configured to deliver the combustion products from the head end to an aft frame; and
    an injector having an outlet located along the liner between the head end and the aft frame;
    wherein, during operation of the liquid fuel cartridge, the outlet of the injector delivers only a stream of oxidant into an interior volume defined by the liner, such that a mixedness and a velocity of the combustion products are increased prior to the combustion products reaching the aft frame; and
    wherein, during gaseous fuel operation, the fuel nozzle delivers a first mixture of gaseous fuel and air, the injector delivers a second mixture of gaseous fuel and air, and the liquid fuel cartridge is unfueled.

2. The combustion system of claim 1, further comprising: a cap separating the head end from the liner; and wherein the cartridge tip extends through and downstream of the cap.

3. The combustion system of claim 2, wherein the fuel nozzle is a bundled tube fuel nozzle including an array of mixing tubes, each mixing tube of the array of mixing tubes having an inlet end through which air is directed and an outlet end disposed through the cap; wherein the bundled tube fuel nozzle is radially outward of the liquid fuel cartridge.

4. The combustion system of claim 3, wherein the cartridge tip extends axially downstream of the outlet ends of the mixing tubes of the array of mixing tubes.

5. The combustion system of claim 2, wherein the plurality of liquid fuel injection ports is configured to deliver liquid fuel into the liner in a predominantly radial direction relative to the flow of combustion products.

6. The combustion system of claim 5, wherein the plurality of liquid fuel injection ports comprises a first plurality of liquid fuel injection ports and a second plurality of liquid fuel injection ports, the first plurality of liquid fuel injection ports being located axially downstream of the second plurality of liquid fuel injection ports.

7. The combustion system of claim 1, further comprising a flow sleeve circumscribing at least a portion of the liner; and wherein the injector is mounted to at least one of the liner and the flow sleeve.

8. The combustion system of claim 7, wherein the injector is one of a plurality of injectors mounted to at least one of the liner and the flow sleeve.

9. A combustion system comprising:
    a head end comprising:
        a cap;
        a bundled tube fuel nozzle including an array of mixing tubes, each mixing tube of the array of mixing tubes having an inlet end through which air is directed and an outlet end positioned through the cap;
        a liquid fuel cartridge unit disposed along a longitudinal axis of the cap and radially inward of the bundled tube fuel nozzle;
        wherein the liquid fuel cartridge unit comprises:
            a cartridge tip extending axially through the cap and beyond the outlet ends of the mixing tubes of the array of mixing tubes, the cartridge tip having an aft plate defining a downstream end of the cartridge tip, a side wall circumscribing the aft plate and defining a frusto-conical shape tapering from an upstream end with a first diameter to the downstream end with a second, smaller diameter, and a plurality of injection ports defined through the side wall;
    a liner extending downstream of the head end to an aft frame; and
    an injector located along the liner between the head end and the aft frame;

wherein the plurality of injection ports injects a liquid fuel in a predominantly radial direction relative to a longitudinal axis of the cap to produce combustion products; and wherein, during operation of the liquid fuel cartridge, the injector delivers only a stream of oxidant into an interior volume defined by the liner for mixing with the combustion products from the liquid fuel cartridge unit; and wherein, during gaseous fuel operation, the bundled tube fuel nozzle delivers a first mixture of gaseous fuel and air, the injector delivers a second mixture of gaseous fuel and air, and the liquid fuel cartridge is unfueled.

10. The combustion system of claim 9, wherein the plurality of injection ports comprises a first plurality of injection ports and a second plurality of injection ports, the second plurality of injection ports being axially upstream of the first plurality of injection ports.

11. The combustion system of claim 9, further comprising a flow sleeve circumscribing at least a portion of the liner; and wherein the injector is mounted to at least one of the liner and the flow sleeve.

12. A method of operating a combustor having a liquid fuel combustion system, the liquid fuel combustion system including a head end with a fuel nozzle and a liquid fuel cartridge, the liquid fuel cartridge configured to produce combustion products via a diffusion flame; a liner configured to deliver the combustion products from the head end to an aft frame; and an injector having an outlet located along the liner between the head end and the aft frame, the method comprising:

injecting liquid fuel from liquid fuel ports defined along a side wall of the liquid fuel cartridge, such that the liquid fuel is injected in a predominantly radial direction, relative to a longitudinal axis of the head end, the liquid fuel cartridge having a frusto-conical tip including an aft plate defining a downstream end of the frusto-conical tip and the side wall circumscribing the aft plate and tapering from an upstream end with a first diameter to the downstream end with a second, smaller diameter;

combusting the liquid fuel with air to produce combustion products via a diffusion flame;

delivering the combustion products in a downstream direction through an interior volume defined by the liner; and while injecting liquid fuel from the liquid fuel ports, injecting inwardly into the interior volume defined by the liner only a stream of oxidant via the injector located axially downstream of the liquid fuel cartridge, thereby increasing a mixedness and a velocity of the combustion products prior to the aft frame to produce combustion products having characteristics of a premixed flame; and after switching to gaseous fuel operation, the fuel nozzle delivers a first mixture of gaseous fuel and air, the injector delivers a second mixture of gaseous fuel and air, and the liquid fuel cartridge is unfueled.

13. The method of claim 12, wherein injecting liquid fuel from the liquid fuel cartridge occurs from the liquid fuel cartridge disposed along the longitudinal axis of the head end.

14. The method of claim 12, wherein the fuel nozzle is a bundled tube fuel nozzle; the method further comprising directing a flow of air through each of a plurality of mixing tubes bundled together in the bundled tube fuel nozzle mounted radially outward of the liquid fuel cartridge.

* * * * *